(12) United States Patent
Faibish et al.

(10) Patent No.: US 10,305,954 B1
(45) Date of Patent: May 28, 2019

(54) STORAGE SYSTEM FOR SCALABLE VIDEO STREAMING USING SOFTWARE-DEFINED STORAGE POOL

(71) Applicant: EMC Corporation, Hopkinton, MA (US)

(72) Inventors: Sorin Faibish, Newton, MA (US); Dennis Ting, Groton, MA (US); Percy Tzelnic, Concord, MA (US); Dominique Cote, Cambridge, MA (US); James M. Pedone, Jr., West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 374 days.

(21) Appl. No.: 15/218,722

(22) Filed: Jul. 25, 2016

(51) Int. Cl.
| | |
|---|---|
| *G06F 15/16* | (2006.01) |
| *H04L 29/06* | (2006.01) |
| *H04L 29/08* | (2006.01) |
| *G06F 16/16* | (2019.01) |
| *G06F 16/182* | (2019.01) |
| *G06F 16/17* | (2019.01) |

(52) U.S. Cl.
CPC .......... *H04L 65/601* (2013.01); *G06F 16/162* (2019.01); *G06F 16/1727* (2019.01); *G06F 16/182* (2019.01); *H04L 67/06* (2013.01); *H04L 67/1097* (2013.01)

(58) Field of Classification Search
CPC ........ G06F 15/16; G06F 15/17; G06F 16/162; G06F 16/182; G06F 16/1727; H04L 47/80; H04L 12/18; H04L 67/10; H04L 12/56; H04L 47/76; H04L 47/82; H04L 65/601; H04L 67/1097; H04L 67/06

USPC ......................................................... 709/219
See application file for complete search history.

(56) References Cited

U.S. PATENT DOCUMENTS

2010/0161843 A1* 6/2010 Spry ................... H04L 67/1097
710/22
2013/0227194 A1 8/2013 Kannan et al.

OTHER PUBLICATIONS

Lougher P. et al., "Scalable storage servers for digital audio and video," Storage and Recording Systems, Apr. 5-7, 1994, Conference Publication No. 402, IEE 1994, pp. 140-143 (Year: 1994).*

(Continued)

*Primary Examiner* — Tu T Nguyen
(74) *Attorney, Agent, or Firm* — Ryan, Mason & Lewis, LLP

(57) ABSTRACT

An apparatus in one embodiment comprises a storage system configured to implement at least one scalable video server. The storage system comprises a software-defined storage pool, and the scalable video server comprises a plurality of file system storage nodes each including a corresponding portion of the software-defined storage pool and an associated file system server. A streaming bandwidth of the scalable video server for a given video stream is controlled by adjusting the number of file system storage nodes utilized for the given video stream in the scalable video server. The file system servers of the respective file system storage nodes are configured to interact with a file system client associated with the given video stream. The streaming bandwidth of the scalable video server for the given video stream may be dynamically adjusted by adding or deleting file system storage nodes to or from the scalable video server.

20 Claims, 6 Drawing Sheets

(56) References Cited

OTHER PUBLICATIONS

"EMC 2 Tiers Solution Prototype," http://veddiew.typepad.com/blog/2015/05/emc-two-tiers-storage-solution-prototype.html, Sep. 25, 2015, 2 pages.

EMC Corporation, "EMC Tiered Storage for SAP: a New Way to Optimize with Use Cases for EMC Symmetrix VMAX with FAST and Virtual LUN," White Paper, Applied Technology, May 2010, 14 pages.

EMC Corporation, "EMC ScaleIO," V1.32, User Guide, #302-001-033, Rev. 11, May 2015, 536 pages.

EMC Corporation, "EMC 2-Tiers—POSIX Namespace for 2nd and 3rd Platform Storage Systems," Dec. 2015, 3 pages.

J. Hilland et al., "RDMA Protocol Verbs Specification (Version 1.0)," draft-hillard-iwarp-verbs-v1.0, Apr. 2003, 243 pages.

EMC Corporation, "EMC Elastic Cloud Storage—Software-Defined Object Storage—Cloud-Scale Capabilities and Economics," EMC Data Sheet, Oct. 2015, 4 pages.

EMC Corporation, "EMC ATMOS Cloud Storage—A Platform to Store, Archive, and Access Unstructured Data at Scale—Data, Application, Access Demands," EMC Data Sheet, Sep. 2014, 3 pages.

EMC Corporation, "Technical White Paper: Elastic Cloud Storage Software Atchitecture—Deploy a Modern Hyperscale Storage Platform on Commodity Infrastructure," EMC White Paper, Feb. 2015, 12 pages.

EMC Corporation, "EMC SCALEIO Operation Overview—Ensuring Non-Disruptive Operation and Upgrade," EMC White Paper, Mar. 2015, 10 pages.

U.S. Appl. No. 14/871,160 filed in the name of S. Faibish et al. on Sep. 30, 2015 and entitled "Translation-Based Name Node Configuration for Object Access in a Multi-Tier Storage System."

Adam Moody, "Overview of the Scalable Checkpoint / Restart (SCR) Library," S&T Principal Directorate—Computation Directorate, Oct. 14, 2009, 33 pages.

U.S. Appl. No. 14/973,245 filed in the name of Sorin Faibish et al. on Dec. 17, 2015 and entitled "Multi-Tier Storage System Having Front-End Storage Tier Implemented Utilizing Software-Defined Storage Functionality.".

U.S. Appl. No. 15/185,236 filed in the name of Sorin Faibish et al. on Jun. 17, 2016 and entitled "Storage System Comprising Cluster File System Storage Nodes and Software-Defined Storage Pool in Cloud Infrastructure.".

* cited by examiner

STORAGE SYSTEM FOR SCALABLE VIDEO STREAMING USING SOFTWARE-DEFINED STORAGE POOL

FIELD

The field relates generally to information processing systems, and more particularly to storage in information processing systems.

BACKGROUND

Various types of information processing systems for serving video streams to user devices over a network are known. However, as video signal resolution continues to increase, it is becoming increasingly challenging for such systems to provide a sufficiently high streaming bandwidth for a given video stream.

SUMMARY

Illustrative embodiments of the present invention provide storage systems that implement scalable video servers using a software-defined storage pool. Such arrangements can easily and efficiently accommodate a wide range of different video signal resolutions, including ultra-high definition (UHD) formats such as 4K resolution and 8K resolution formats, where 4K resolution denotes a horizontal resolution of approximately 4000 pixels and 8K resolution denotes a horizontal resolution of approximately 8000 pixels.

In one embodiment, an apparatus comprises a storage system configured to implement at least one scalable video server. The storage system comprises a software-defined storage pool, and the scalable video server comprises a plurality of file system storage nodes each including a corresponding portion of the software-defined storage pool and an associated file system server. A streaming bandwidth of the scalable video server for a given video stream is controlled by adjusting the number of file system storage nodes utilized for the given video stream in the scalable video server. The file system servers of the respective file system storage nodes are configured to interact with a file system client associated with the given video stream.

By way of example, the streaming bandwidth of the scalable video server for the given video stream may be dynamically adjusted by adding or deleting file system storage nodes to or from the scalable video server.

In some embodiments, the file system servers of the respective file system storage nodes are distributed across multiple physical machines of the storage system. One or more of the physical machines may each comprise at least one of a software-defined storage client and a software-defined storage server configured to provide one or more of the file system servers with access to storage resources of the one or more physical machines.

For example, a given one of the file system servers is illustratively implemented on a first physical machine and is associated with a software-defined storage client also implemented on that first physical machine. The software-defined storage client is configured to interact with a corresponding software-defined storage server implemented on a second physical machine so as to provide the given file system server with access to storage resources of the second physical machine.

These and other illustrative embodiments include, without limitation, apparatus, systems, methods and processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
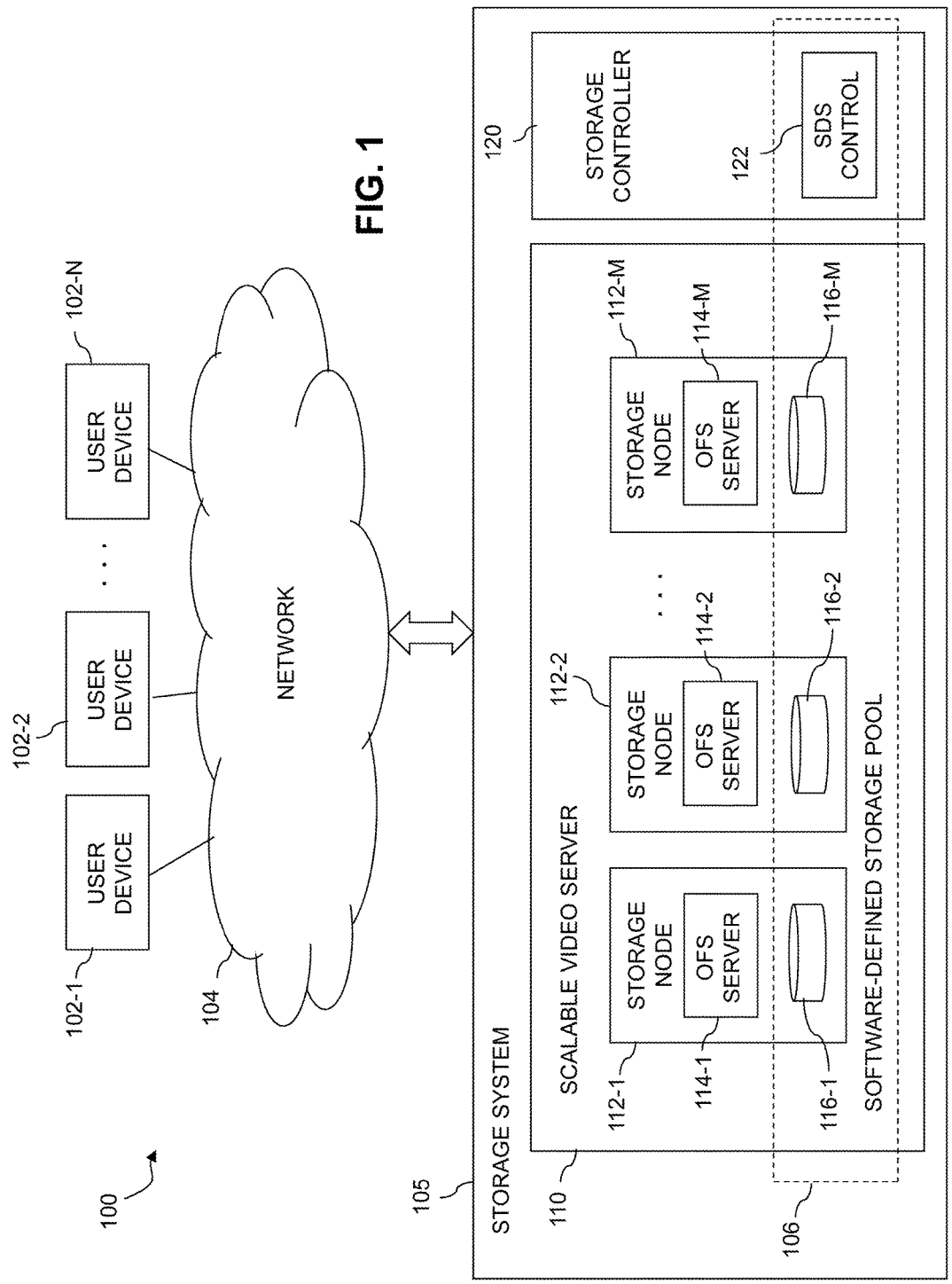
FIG. 1 is a block diagram of an information processing system comprising a storage system that implements a scalable video server using a software-defined storage pool in an illustrative embodiment.

FIG. 1 shows an information processing system 100 configured in accordance with an illustrative embodiment of the present invention. The information processing system 100 is assumed to be built on at least one processing platform and provides functionality for scalable video streaming using a software-defined storage pool. In this embodiment, the system 100 more particularly comprises a plurality of user devices 102-1, 102-2, . . . 102-N coupled to a network 104. Also coupled to the network 104 is a storage system 105 comprising a software-defined storage pool 106.

The user devices 102 can comprise, for example, desktop, laptop or tablet computers, mobile telephones, or other types of processing devices capable of communicating with the storage system 105 over the network 104. As a more particular example, in some embodiments the user devices implement video editing software for use in editing video that is streamed to the user devices from the software-defined storage pool 106.

The "users" in a given embodiment may refer, for example, to respective ones of the user devices 102, although the term "user" as utilized herein is intended to be broadly construed so as to encompass numerous other arrangements of human, hardware, software or firmware entities, as well as combinations of such entities.

The network 104 may comprise any type of network, including by way of example a global computer network such as the Internet, a wide area network (WAN), a local area network (LAN), a satellite network, a telephone or cable network, a cellular network, a wireless network such as a WiFi or WiMAX network, or various portions or combinations of these and other types of networks.

The storage system 105 is configured to implement a scalable video server 110 utilizing the software-defined storage pool 106. More particularly, the scalable video server 110 in this embodiment comprises a plurality of file system storage nodes 112-1, 112-2, . . . 112-M comprising respective instances of a plurality of Orange File System (OFS) servers 114-1, 114-2, . . . 114-M and respective portions 116-1, 116-2, . . . 116-M of the software-defined storage pool 106. Accordingly, each of the file system storage nodes 112 of the scalable video server 110 comprises a corresponding one of the OFS servers 114 and a corresponding one of the portions 116 of the software-defined storage pool 106.

The storage system 105 further comprises a storage controller 120. The storage controller 120 comprises a software-defined storage controller illustratively in the form of an SDS control module 122. The SDS control module 122 is configured to implement the software-defined storage pool 106 utilizing storage resources of the storage system. Such storage resources illustratively comprise non-volatile memories, such as flash memories, of a plurality of physical machines. Alternative types of electronic memories that can be used include dynamic random access memories (DRAMs), or various combinations of flash memory, DRAM or other types of electronic memory. However, it is to be appreciated that the software-defined storage pool 106 can contain numerous other types of storage resources, including disk resources such as hard disk drives (HDDs) as well as solid-state storage devices such as solid-state drives (SSDs), and combinations of these and other storage resource types.

The OFS servers 114 of the respective file system storage nodes 112 are examples of what are more generally referred to herein as "file system servers," and it is to be appreciated that other types of file system servers may be used in place of the OFS servers 114 in other embodiments. For example, other types of parallel file systems, distributed file systems or other cluster file systems, or combinations of multiple file systems of potentially different types, can be used in other embodiments. The use of OFS in the FIG. 1 embodiment and other embodiments herein is therefore by way of illustrative example only.

The OFS servers 114 are configured to interact with one or more OFS clients which are not explicitly shown in the figure. For example, at least a subset of the user devices 102 can each include an OFS client that is configured to interact with one or more of the OFS servers 114 in order to receive streaming video comprising at least one video stream from the scalable video server 110.

Accordingly, a given one of the OFS clients in the present embodiment is illustratively implemented in one of the user devices 102 that communicates with the scalable video server 110 over the network 104. The OFS clients in some embodiments are configured to implement frame pre-fetching and buffering such that, for example, frames of a given video stream are cached on a frame-by-frame basis by a corresponding OFS client. This ensures that the OFS client can cache entire frames. It should be noted, however, that partial frames can be cached in other embodiments. Moreover, the OFS client can provide feedback that causes the scalable video server 110 to be reconfigured to accommodate any variations in streaming rates required by a given video streaming application. Other types and arrangements of file system clients can be implemented in other embodiments. For example, in some embodiments, an OFS client can be implemented within a local node of the scalable video server. Such a local node may correspond to one of the file system storage nodes 112 or a different node.

The video streams provided by the scalable video server 110 illustratively include video signals in UHD formats such as 4K resolution and 8K resolution formats. For example, the 4K resolution format may comprise a 2160p format having a resolution of 3840×2160 pixels, and the 8K format may comprise a 4320p format having a resolution of 7680× 4320 pixels. In this example, the 8K format has two times the horizontal and vertical resolution and four times the total number of pixels of the 4K format. Similarly, the 4K format in this example has two times the horizontal and vertical resolution and four times the total number of pixels of a full high definition 1080p format. Numerous other types of video signal formats can be used in other embodiments. It is therefore to be appreciated that the term "video" as used herein is intended to be broadly construed so as to encompass, for example, various types of multimedia signals that incorporate video as well as other information.

The scalable video server 110 in the present embodiment is illustratively configured to accommodate streaming of video to the user devices 102 in the above-noted formats through dynamic reconfiguration of the number and type of file system storage nodes 112 that support such video streaming. For example, a streaming bandwidth of the scalable video server 110 for a given video stream can be controlled by adjusting the number of file system storage nodes 112 utilized for the given video stream in the scalable video server 110. In some embodiments, this may involve dynamically adjusting the streaming bandwidth of the scalable video server 110 for the given video stream by adding or deleting file system storage nodes to or from the scalable video server.

References herein to such addition or deletion of file system storage nodes are intended to be broadly construed so as to encompass arrangements in which file system storage nodes are allocated and unallocated to the given video stream, or activated and deactivated for the given video stream. Accordingly, file system storage nodes added to or deleted from the scalable video server in the context of a given video stream need not be removed from the scalable video server altogether, and could instead, for example, be returned to a pool of available file system storage nodes for potential allocation to other video streams to be delivered by the scalable video server 110 over the network 104.

Additionally or alternatively, the type or configuration of one or more of the file system storage nodes 112 can be adjusted in order to support the provision of a desired streaming bandwidth. For example, the size and configuration of the portions 116 of the software-defined storage pool 106 can be adjusted in order to support the provision of the desired streaming bandwidth. Additional details of such arrangements will be described below in conjunction with FIGS. 3 through 6.

These and other variations in at least one of the number, type and configuration of the file system storage nodes 112 provide scalability of the video server to the particular needs of a given video streaming application. The term "scalable video server" as used herein is intended to be broadly construed so as to encompass these and other types of scalability features that may be implemented in a given embodiment. The scalability may be dynamic in that a given embodiment can be reconfigured to support video streaming requirements that vary over time.

Particular video files to be streamed to the user devices 102 by the scalable video server 110 are illustratively "striped" across the multiple file system storage nodes 112 that are used to stream those files. More particularly, portions of a given video file are stored in respective ones of the portions 116 of the software-defined storage pool 106 that are associated with respective ones of the file system storage nodes 112.

The portions 116 of the software-defined storage pool 106 in some embodiments comprise respective sets of one or more logical units having respective logical unit numbers (LUNs). Thus, a given one of the portions 116 can comprise a combination of multiple LUNs suitably configured to support a desired streaming bandwidth for a given video stream provided by the scalable video server 110.

In some embodiments, the given video stream provided by the scalable video server 110 comprises a combination of multiple sub-streams served by respective ones of the OFS servers 114 of the respective file system storage nodes 112 to a file system client implemented on one of the user devices 102. Each such sub-stream illustratively includes the particular set of striped portions of the stored video signal that reside on the corresponding file system storage node.

Such an arrangement also serves to reduce streaming latency within the system 100. By way of example, consider a video streaming application in which 25 MB frames are striped across 25 different file system storage nodes. This involves storing different 1 MB portions of each 25 MB frame on respective ones of the 25 different file system storage nodes. As a result, the relatively high latency that would otherwise be incurred in streaming a 25 MB frame from a single file system is reduced to the relatively low latency achievable by streaming the multiple 1 MB portions in parallel from the 25 different file system storage nodes.

It is also possible in some embodiments for at least one of the number, type and configuration of the particular ones of the file system storage nodes 112 utilized for the given video stream in the scalable video server 110 to be controlled based at least in part on feedback from the file system client.

The OFS servers 114 are illustratively distributed across multiple physical machines of the storage system 105. In some embodiments, one or more of the physical machines each comprise at least one of a software-defined storage client and a software-defined storage server configured to provide one or more of the OFS servers 114 with access to storage resources of the one or more physical machines.

As a more particular example, a given one of the OFS servers 114 may be implemented on a first physical machine and associated with a software-defined storage client also implemented on that first physical machine. The software-defined storage client is configured to interact with a corresponding software-defined storage server implemented on a second physical machine so as to provide the given one of the OFS servers 114 with access to storage resources of the second physical machine.

In some embodiments, the scalable video server 110 is configured to select one of a plurality of preconfigured directories for establishing a desired streaming bandwidth for a given video stream. Such preconfigured directories may include, for example, a first directory associated with a first relatively low frame rate and a first subset of the file system storage nodes 112, and a second directory associated with a second relatively high frame rate and a second subset of the file system storage nodes 112 different than the first subset of file system storage nodes. These and other directories associated with the scalable video server 110 may be established by the storage controller 120 utilizing portions 116 of the software-defined storage pool 106 allocated by the SDS control module 122.

As a more particular example, consider an embodiment that implements a 4K streaming application of a video signal that switches between different frame rates, such as a relatively low 30 frames per second (fps) rate and a relatively high 60 fps rate. A scalable video server as disclosed herein can accommodate such an arrangement by using different first and second directories for 30 fps frames and 60 fps frames. Different arrangements of appropriately-configured file system storage nodes are associated with each directory. This may involve providing different subsets of a given set of file system storage nodes, or information specifying reconfigurations of the given set of file system storage nodes. The scalable video server can then be dynamically reconfigured to stream the 30 fps frames from the first directory at a 1.5 GB/sec rate and to stream the 60 fps frames from the second directory at a 3.0 GB/sec rate, by corresponding selection and/or reconfiguration of the associated file system storage nodes. Such dynamic reconfiguration of the scalable video server is assumed to be directed at least in part by the storage controller 120.

Although the storage system 105 in the present embodiment is illustrated as a single-tier storage system in which the single tier comprises the software-defined storage pool 106, other embodiments can implement multi-tier storage systems. For example, a front-end storage tier of a multi-tier storage system can be used to support a scalable video server of the type disclosed herein. Such a multi-tier storage system additionally includes one or more other storage tiers, such as a back-end storage tier in the form of a capacity tier. Numerous alternative arrangements of storage system 105 are possible in other embodiments.

The physical machines utilized in implementing at least portions of the software-defined storage pool 106 of the storage system 105 can be interconnected with one another using high-speed connections. For example, data can be moved between at least a subset of the physical machines using remote direct memory access (RDMA) connections over InfiniBand or Gigabit Ethernet. Numerous other types of connections and associated data transfer protocols can be used in other embodiments.

The software-defined storage pool 106 and its associated storage controller 120 comprising SDS control module 122 in some embodiments are implemented using ScaleIO™ software-defined storage products commercially available from EMC Corporation of Hopkinton, Mass.

The use of ScaleIO™ software-defined storage in some embodiments provides advantages in terms of an ability to recover from failures. For example, in the event of a failure in a given one of the physical machines that provides a corresponding portion of the software-defined storage pool 106, data mirrored by ScaleIO™ to one or more other ones of the physical machines can be obtained quickly and easily in order to recover from the failure.

Additional details regarding ScaleIO™ functionality that can be incorporated into a software-defined storage controller in illustrative embodiments can be found in, for example, EMC ScaleIO™ User Guide, V1.32, Document No. 302-001-033, Rev. 11, May 2015, which is incorporated by reference herein. However, it is to be appreciated that other types of software-defined storage products, such as ViPR® products also commercially available from EMC Corporation, can be used in other embodiments.

In some embodiments, the SDS control module 122 used to configure the portions 116 of the software-defined storage pool 106 is implemented in a distributed manner over respective ones of the file system storage nodes 112 or their associated physical machines. For example, different portions of a distributed SDS control module 122 can be implemented on respective ones of a plurality of different physical machines each supporting one or more of the file system storage nodes 112.

The use of OFS servers 114 in the FIG. 1 embodiment is advantageous in that such servers can be scaled in a substantially linear manner so as to increase the available streaming bandwidth for a given video stream delivered by the scalable video server 110. For example, additional OFS servers can be added on a given physical machine until the network resources of that physical machine are saturated by a single video stream. Implementations providing single stream bandwidths of 5-10 GB/sec can be readily supported.

It is to be appreciated that these and other features of illustrative embodiments are presented by way of example only, and should not be construed as limiting in any way.

Accordingly, different numbers, types and arrangements of file system storage nodes, file system servers, software-defined storage pools, controllers and other system elements can be used in other embodiments.

As indicated previously, the storage system 105 can include a wide variety of different types of storage resources implemented using one or more storage platforms. For example, a given storage platform can comprise any of a variety of different types of storage including network-attached storage (NAS), storage area networks (SANs), direct-attached storage (DAS) and distributed DAS, as well as combinations of these and other storage types, including software-defined storage.

In addition to the previously-mentioned software-defined storage products such as ScaleIO™ and ViPR®, a given storage platform may comprise storage arrays such as VNX® and Symmetrix VMAX® storage arrays, both commercially available from EMC Corporation. Other types of storage products that can be used in implementing a given storage platform in an illustrative embodiment include the server-based flash storage devices such as DSSD™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage platform in an illustrative embodiment.

These and other storage platforms can be part of what is more generally referred to herein as a processing platform comprising one or more processing devices each comprising a processor coupled to a memory. A given such processing device may correspond to one or more virtual machines or other types of virtualization infrastructure such as Docker containers or other types of Linux containers (LXCs). The SDS control module 122 of storage controller 120, as well as other system components, may be implemented at least in part using processing devices of such processing platforms.

For example, in a distributed implementation of the SDS control module 122, different instances of the distributed SDS control module 122 may be implemented in respective LXCs running on respective ones of the file system storage nodes 112 or their associated physical machines.

As another example, different OFS server instances can be implemented in respective LXCs and load balancing can be achieved by moving the LXCs between different physical machines on demand.

As mentioned above, communications between the various elements of system 100 may take place over one or more networks. For example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of FIG. 2. The process as shown includes steps 200 through 204, and is suitable for use in the system 100 but is more generally applicable to other types of systems comprising a scalable video server comprising file system storage nodes that include respective portions of a software-defined storage pool.

In step 200, a storage system is configured to include a software-defined storage pool. In the context of the FIG. 1 embodiment, software-defined storage pool 106 is provided under the control of SDS control module 122 of storage controller 120.

In step 202, a scalable video server is implemented in the storage system utilizing a plurality of file system storage nodes each comprising a corresponding portion of the software-defined storage pool and an associated file system server. For example, with reference to FIG. 1, the scalable video server 110 of information processing system 100 implements file system storage nodes 112 each of which comprises a corresponding one of the portions 116 of the software-defined storage pool 106 and a corresponding one of the OFS servers 114. As mentioned above, the software-defined storage pool 106 in some embodiments in some embodiments comprises a ScaleIO™ software-defined storage pool, although other types of software-defined storage can be used in other embodiments.

In step 204, a streaming bandwidth of the scalable video server for a given video stream is controlled by adjusting the number of file system storage nodes utilized for the given video stream in the scalable video server. The file system servers of the respective file system storage nodes are configured to interact with a file system client associated with the given video stream. For example, in the FIG. 1 embodiment, the number of file system storage nodes 112 allocated to the given video stream can be adjusted in order to provide a desired streaming bandwidth.

Additionally or alternatively, the type and configuration of one or more of the file system storage nodes 112 can be adjusted in order to provide the desired streaming bandwidth for the given video stream. Such adjustments in some embodiments can involve altering the size or configuration of one or more of the portions 116 of the software-defined storage pool.

Figure 2:
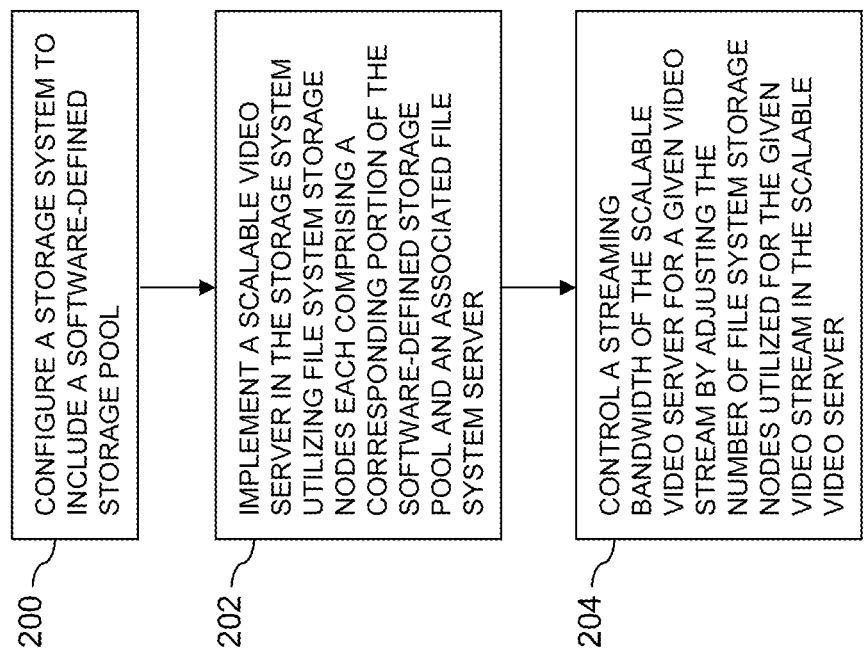
FIG. 2 is a flow diagram of a process for implementing a scalable video server using a software-defined storage pool in an illustrative embodiment.

In one possible implementation of the FIG. 2 process, instances of the file system storage nodes and their OFS servers are spawned as needed based on the streaming bandwidth requirements of the application. For example, a given application may require different streaming rates at different times. In order to support such an application, the scalable video server can be configured to initially stream at 1.6 GB/sec using four OFS servers and then subsequently be reconfigured to stream at 3.2 GB/sec using eight OFS servers. Numerous other arrangements are possible.

The particular processing operations and other system functionality described in conjunction with the flow diagram of FIG. 2 are presented by way of illustrative example only, and should not be construed as limiting the scope of the invention in any way. Alternative embodiments can use other types of processing operations involving a scalable video server implemented at least in part utilizing a software-defined storage pool. For example, the ordering of the process steps may be varied in other embodiments, or certain steps may be performed concurrently with one another rather than serially. Also, one or more of the process steps may be repeated periodically, or multiple instances of the process can be performed in parallel with one another in order to, for example, implement multiple scalable video servers each potentially providing a plurality of different video streams to different sets of clients within a given information processing system.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments of information processing systems with scalable video streaming functionality will now be described with reference to FIGS. 3 through 6. In these embodiments, a scalable video server is implemented using file system storage nodes each comprising an OFS server and a corresponding portion of a software-defined storage pool. It is assumed for description of these embodiments that the software-defined storage pool is implemented using ScaleIO™ software-defined storage, although other types of software-defined storage can be used in other embodiments. The portions of the software-defined storage pool in these embodiments are more particularly referred to as ScaleIO™ ("SIO") portions of the software-defined storage pool.

The different system configurations shown in FIGS. 3 through 6 can be viewed as respective distinct reconfigurations of a single scalable video server with such reconfigurations being made over time in order to accommodate changing bandwidth needs of a particular user device. Accordingly, a single scalable video server can be dynamically reconfigured to provide each of the system configurations illustrated in FIGS. 3 through 6. Alternatively, these illustrative embodiments can be viewed as representing entirely different systems in which different scalable video servers are configured to deliver streaming video to different types of user devices having different bandwidth needs.

The file system in each of the embodiments of FIGS. 3 through 6 is again assumed to comprise OFS ("OrangeFS"), although it is to be appreciated that other file systems, or combinations of multiple file systems of potentially different types, can be used in other embodiments. OFS is a type of parallel file system, which is an example of what is more generally referred to herein as a "cluster file system."

Figure 3:
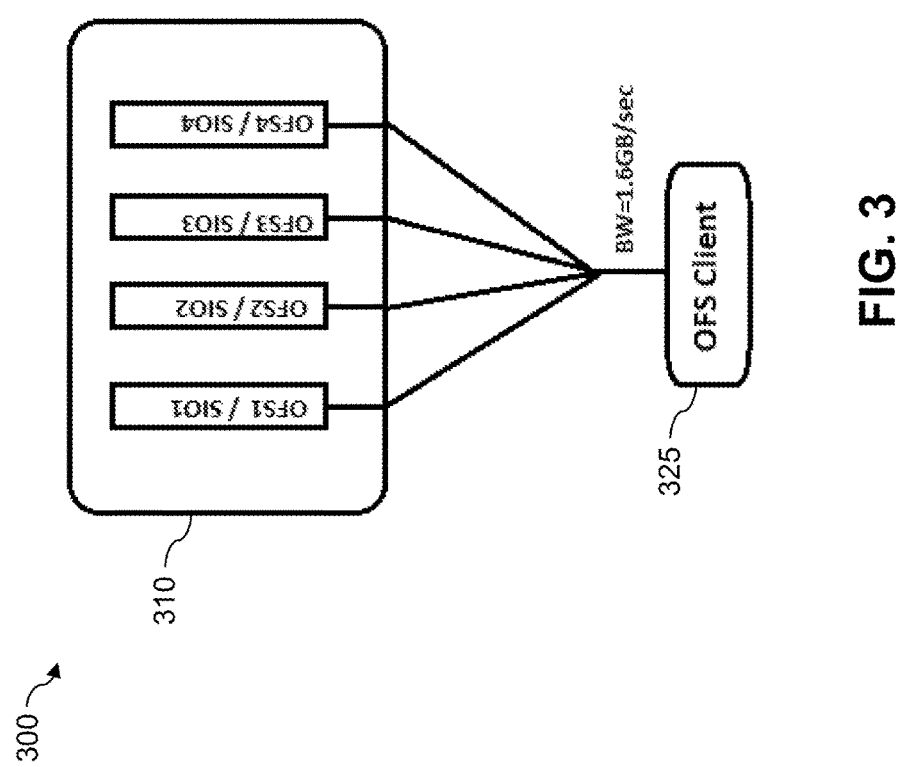
FIGS. 3 through 6 show information processing systems with scalable video streaming functionality in other illustrative embodiments.

Referring initially to FIG. 3, an information processing system 300 comprises a scalable video server 310 configured to deliver a given video stream to an OFS client 325. In this embodiment, the OFS client 325 is assumed to be associated with a user device that can support a bandwidth of 1.6 GB/sec, possibly due to maximum bandwidth limitations of its network interface card (NIC). The scalable video server 310 in this embodiment delivers a 1.6 GB/sec video stream to the OFS client 325 using four file system storage nodes comprising respective OFS servers denoted OFS1, OFS2, OFS3 and OFS4 that interact with respective SIO portions denoted SIO1, SIO2, SIO3 and SIO4.

Figure 4:
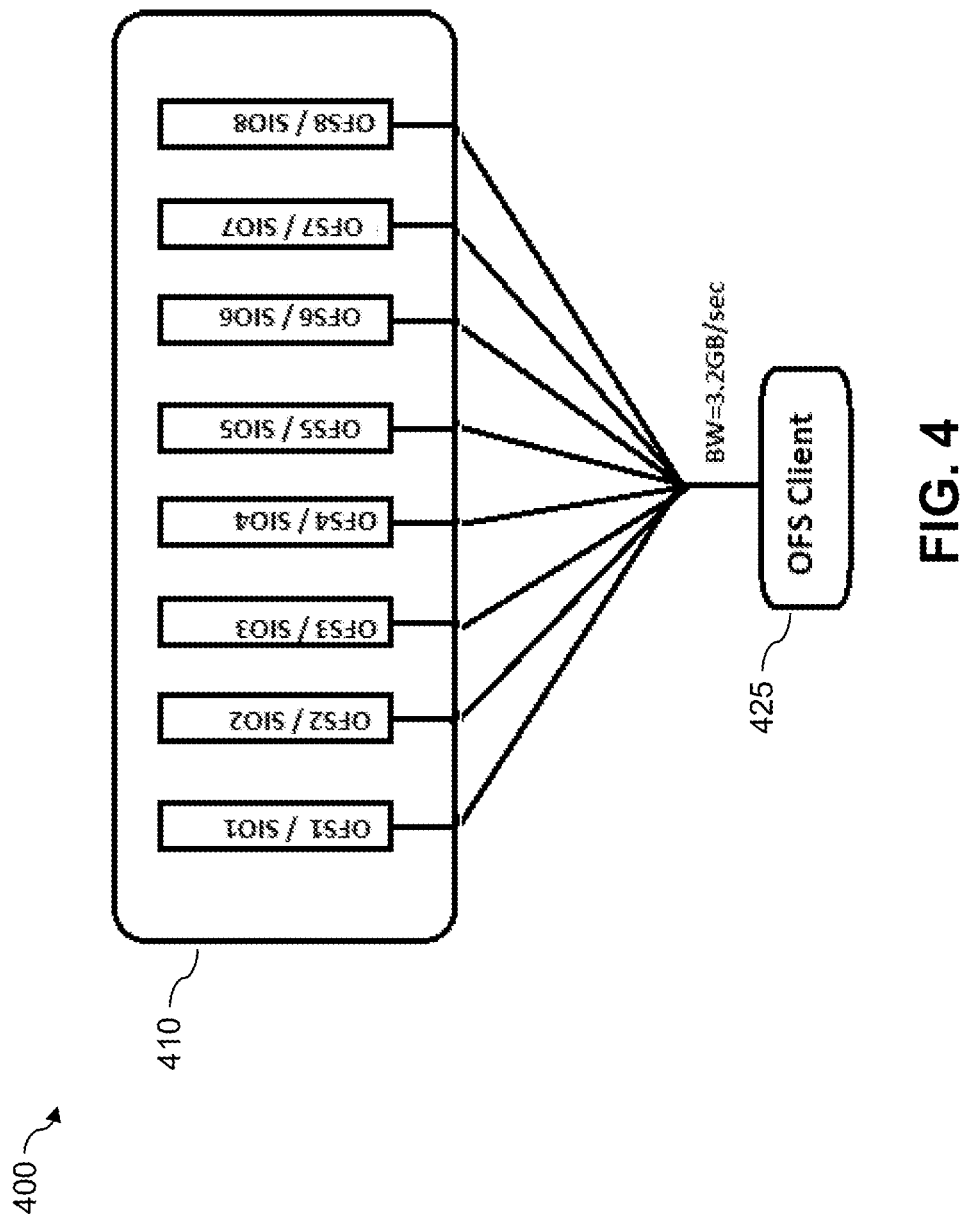
Figure 5:
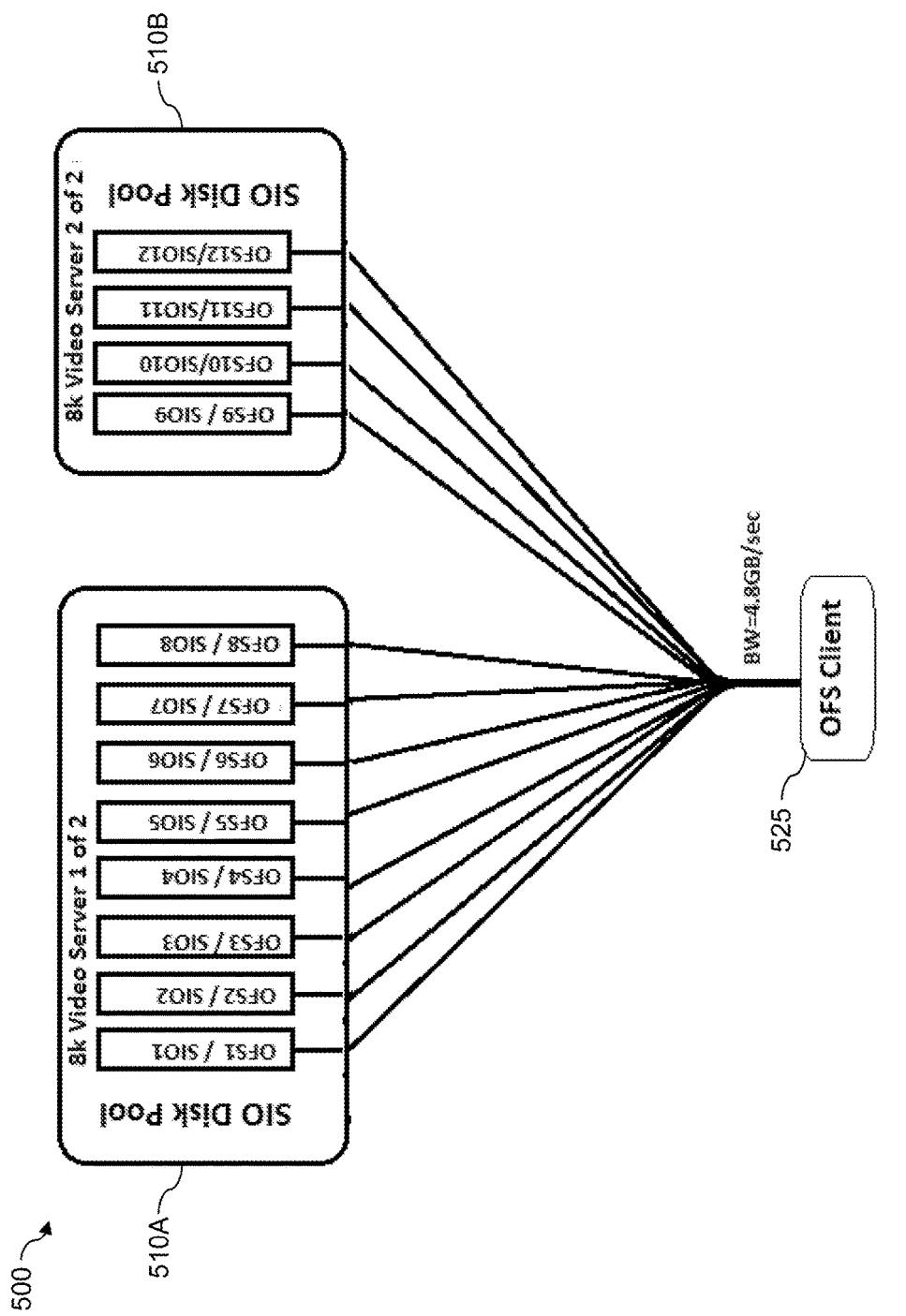
Figure 6:
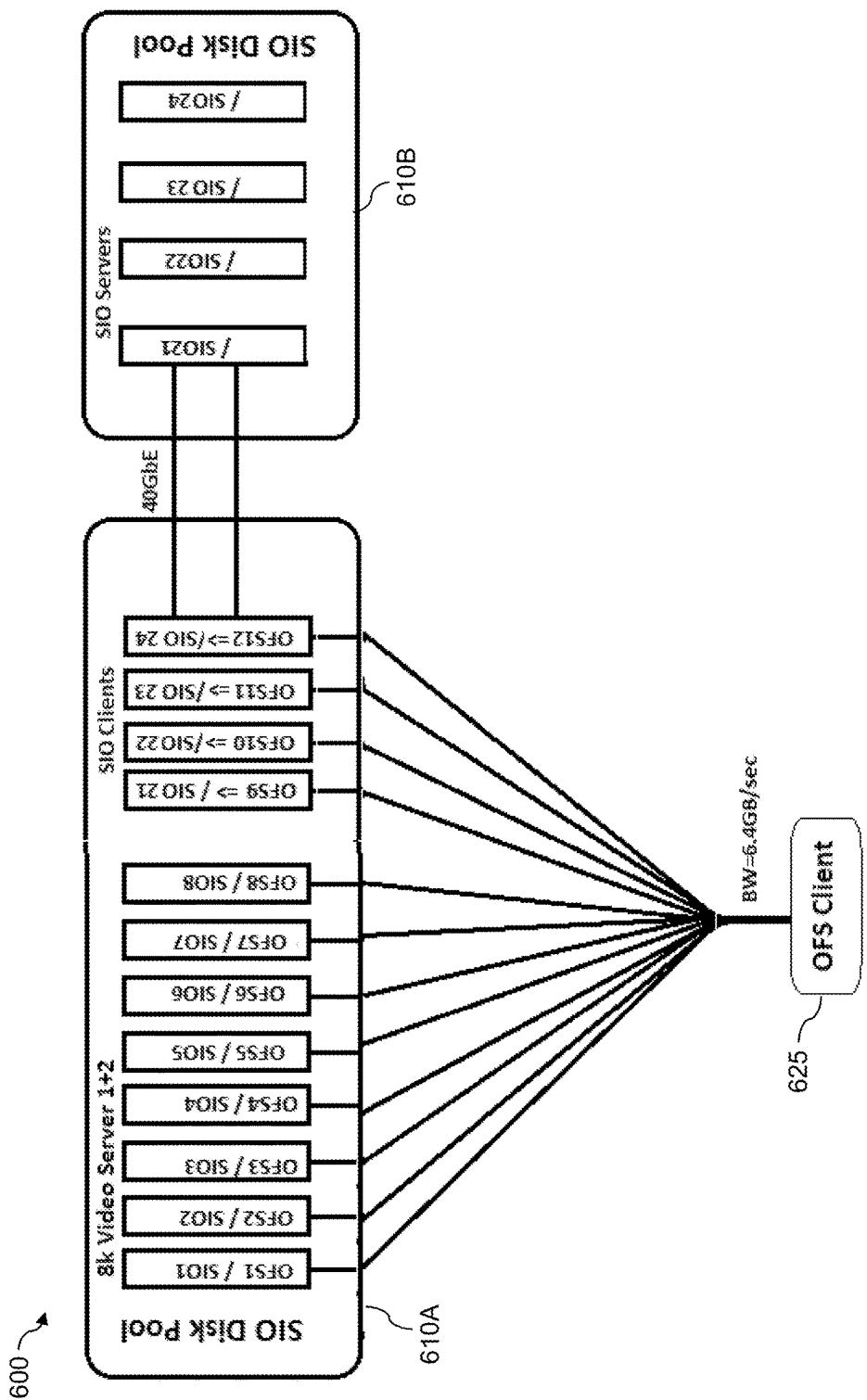

It is assumed in this embodiment and the embodiments of FIGS. 4, 5 and 6 that each OFS server can support a video streaming bandwidth of 0.4 GB/sec. Thus, in the FIG. 3 embodiment, the 1.6 GB/sec video streaming bandwidth is provided using four OFS servers each having a corresponding SIO portion. In other embodiments, alternative video streaming bandwidths can be supported by the OFS servers. Also, different ones of the OFS servers can be configured to support different video streaming bandwidths.

FIG. 4 shows another embodiment in which an information processing system 400 comprises a scalable video server 410 configured to deliver a 3.2 GB/sec video stream to an OFS client 425. In this embodiment, the scalable video server 410 is configured with eight OFS servers denoted OFS1 through OFS8, having respective portions SIO1 through SIO8 of a software-defined storage pool. As mentioned previously, the scalable video server 410 in the FIG. 4 embodiment may be viewed as representing one possible reconfiguration of the scalable video server 310 of the FIG. 3 embodiment.

With reference now to FIG. 5, an information processing system 500 comprises a scalable video server that comprises two distinct 8K video servers 510A and 510B. The 8K video servers are also denoted 8K video server 1 and 8K video server 2, and collectively deliver a 4.8 GB/sec video stream to an OFS client 525.

Each of the 8K video servers 510A and 510B comprises multiple OFS servers each having a corresponding portion of an SIO software-defined storage pool, illustratively an SIO disk pool in the present embodiment. More particularly, the 8K video server 510A is configured with eight OFS servers denoted OFS1 through OFS8, having respective portions SIO1 through SIO8 of an SIO disk pool. Similarly, the 8K video server 510B is configured with four OFS servers denoted OFS9 through OFS12, having respective portions SIO9 through SIO12 of an SIO disk pool. This is assumed to be the same SIO disk pool used to implement 8K video server 510A, although different SIO disk pools could be used for the different 8K video servers 510A and 510B in other embodiments.

FIG. 6 illustrates another technique for increasing the bandwidth available for streaming to a given client. In this embodiment, an information processing system 600 comprises a scalable video server having first and second parts 610A and 610B. The first part 610A includes the same twelve OFS servers OFS1 through OFS12 that are provided by the 8K video servers 1 and 2 in the FIG. 5 embodiment. However, instead of directly interacting with portions SIO9 through SIO12 as in FIG. 5, the OFS servers OFS9 through OFS12 in this embodiment interact with respective SIO clients denoted SIO21, SIO22, SIO23 and SIO24. These SIO clients interact with respective SIO servers also denoted SIO21, SIO22, SIO23 and SIO24 but implemented on a different physical machine corresponding to part 610B of the scalable video server.

Thus, part 610A in this embodiment is assumed to be implemented using one or more physical machines, and part 610B is assumed to be implemented on another physical machine. The physical machine implementing part 610B communicates via 40 GbE ("Gigabit Ethernet") connections with the other physical machine(s) implementing part 610A. Accordingly, the OFS servers OFS9 through OFS12 in this embodiment can access the storage resources of the physical machine implementing part 610B via the corresponding SIO client-server pairs denoted SIO21 through SIO24. This allows the parts 610A and 610B of the scalable video server to collectively deliver a 6.4 GB/sec video stream to an OFS client 625. This particular video streaming rate corresponds to a PCIe x8 bandwidth of an InfiniBand host channel adaptor (HCA), although as mentioned previously, other rates can be used in other embodiments.

In the FIG. 6 embodiment, the additional physical machine of part 610B coupled via the 40 GbE connections to the one or more other machines of part 610A provides additional storage resources to the SIO disk pool, thereby allowing the higher rate 6.4 GB/sec video stream to be supported by the scalable video server.

The embodiments of FIGS. 3 through 6 provide illustrative examples of the manner in which a video server can be scaled to provide different levels of streaming bandwidth to a given file system client. Each embodiment assumes that its OFS client is part of a user device having one or more NICs capable of receiving a video signal at the corresponding streaming bandwidth level provided by the scalable video server. The reconfiguration of the scalable video server is illustratively performed under the control of a storage controller such as the storage controller 120 in the FIG. 1 embodiment. For example, such a storage controller can be used to adjust the particular number, type and configuration of file system storage nodes used in delivering a given video stream to a particular file system client.

It should be understood that the particular system configurations illustrated in FIGS. 3 through 6 are presented by way of illustrative example only, and should not be construed as limiting in any way. Numerous alternative configurations of scalable video servers, file system storage nodes, software-defined storage pools and other system elements can be used in other embodiments.

Illustrative embodiments disclosed herein can provide a number of significant advantages relative to conventional arrangements.

For example, one or more embodiments allow efficient and flexible scaling of streaming bandwidth for a given video stream to a maximum level that can be delivered to a particular user device. A single high-bandwidth video stream can be separated into multiple sub-streams each delivered by a different file system server using a corresponding portion of a software-defined storage pool. In this manner, high resolution video streams such as video streams in 4K and 8K resolution formats can be easily delivered to any user device that has sufficient network interface capability.

As another example, additional storage resources on additional physical machines can be made accessible to file system server nodes on one or more other physical machines using software-defined storage clients and software-defined storage servers. Accordingly, storage resource limitations of individual physical machines can be easily overcome through the use of additional physical machines.

One or more embodiments allow a scalable video server to be dynamically reconfigured to support different streaming rates at different times responsive to the changing bandwidth requirements of a given video streaming application.

In some embodiments, latency in streaming of video is significantly reduced by striping a given video file across multiple file system storage nodes each comprising a file system server and a corresponding portion of a software-defined storage pool.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system. For example, instances of the storage controller 120 can be implemented using virtual machines.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective portions of a distributed implementation of the SDS control module 122 of the storage controller 120.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™ or Vblock® converged infrastructure commercially available from VCE, the Virtual Computing Environment Company, an EMC Federation Company.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of the storage controller 120 are illustratively implemented in the form of software running on one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, scalable video servers, file system storage nodes, file system servers, file system clients, software-defined storage pools and associated storage devices. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a storage system configured to implement at least one scalable video server;
the storage system comprising a software-defined storage pool;
the scalable video server comprising a plurality of file system storage nodes each including a corresponding portion of the software-defined storage pool and an associated file system server;
the file system servers of the respective file system storage nodes being configured to interact with a file system client;
wherein a streaming bandwidth of the scalable video server for a given video stream is controlled by adjusting the number of file system storage nodes utilized for the given video stream in the scalable video server;
wherein controlling the streaming bandwidth of the scalable video server for the given video stream comprises dynamically adjusting the streaming bandwidth by adding or deleting file system storage nodes to or from the scalable video server; and
wherein the storage system is implemented by a processing platform comprising a plurality of processing devices.

2. The apparatus of claim 1 wherein the file system client is implemented in a user device that communicates with the scalable video server over a network or is implemented locally within a node of the scalable video server.

3. The apparatus of claim 1 wherein frame pre-fetching and buffering are implemented by the file system client such that frames of the given video stream are cached on a frame-by-frame basis or a partial frame basis by the file system client.

4. The apparatus of claim 1 wherein the corresponding portion of the software-defined storage pool file for a given one of the file system storage nodes comprises one or more logical units having respective logical unit numbers.

5. The apparatus of claim 1 wherein the given video stream provided by the scalable video server comprises a combination of multiple sub-streams served by respective ones of the file system servers of the respective file system storage nodes to the file system client.

6. The apparatus of claim 1 wherein the number of file system storage nodes utilized for the given video stream in the scalable video server is controlled based at least in part on feedback from the file system client.

7. The apparatus of claim 1 wherein the file system servers of the respective file system storage nodes are distributed across multiple physical machines of the storage system.

8. The apparatus of claim 7 wherein one or more of the physical machines each comprise at least one of a software-defined storage client and a software-defined storage server configured to provide one or more of the file system servers with access to storage resources of the one or more physical machines.

9. The apparatus of claim 1 wherein a given one of the file system servers is implemented on a first physical machine and is associated with a software-defined storage client also implemented on that first physical machine and further wherein the software-defined storage client is configured to interact with a corresponding software-defined storage server implemented on a second physical machine so as to provide the given file system server with access to storage resources of the second physical machine.

10. The apparatus of claim 1 wherein the scalable video server is configured to select one of a plurality of preconfigured directories for establishing the streaming bandwidth for the given video stream including a first directory associated with a first relatively low frame rate and a first subset of the file system storage nodes and a second directory associated with a second relatively high frame rate and a second subset of the file system storage nodes different than the first subset of the file system storage nodes.

11. The apparatus of claim 1 further comprising a software-defined storage controller configured to implement the software-defined storage pool utilizing storage resources of the storage system wherein the storage resources comprise non-volatile memories of a plurality of physical machines.

12. A method comprising:
configuring a storage system to include a software-defined storage pool;
implementing a scalable video server in the storage system utilizing a plurality of file system storage nodes each comprising a corresponding portion of the software-defined storage pool and an associated file system server; and
controlling a streaming bandwidth of the scalable video server for a given video stream by adjusting the number of file system storage nodes utilized for the given video stream in the scalable video server;
wherein the file system servers of the respective file system storage nodes are configured to interact with a file system client associated with the given video stream;
wherein controlling the streaming bandwidth of the scalable video server for the given video stream comprises dynamically adjusting the streaming bandwidth for the given video stream by adding or deleting file system storage nodes to or from the scalable video server; and
wherein the method is performed by a processing platform comprising a plurality of processing devices.

13. The method of claim 12 wherein the given video stream provided by the scalable video server comprises a combination of multiple sub-streams served by respective ones of the file system servers of the respective file system storage nodes to the file system client.

14. The method of claim 12 wherein the number of file system storage nodes utilized for the given video stream in the scalable video server is controlled based at least in part on feedback from the file system client.

15. A non-transitory processor-readable storage medium having stored therein program code of one or more software programs, wherein the program code when executed by a processing platform causes said processing platform:
to configure a storage system to include a software-defined storage pool;
to implement a scalable video server in the storage system utilizing a plurality of file system storage nodes each comprising a corresponding portion of the software-defined storage pool and an associated file system server; and
to control a streaming bandwidth of the scalable video server for a given video stream by adjusting the number of file system storage nodes utilized for the given video stream in the scalable video server;
wherein the file system servers of the respective file system storage nodes are configured to interact with a file system client associated with the given video stream; and
wherein controlling the streaming bandwidth of the scalable video server for the given video stream comprises dynamically adjusting the streaming bandwidth for the given video stream by adding or deleting file system storage nodes to or from the scalable video server.

16. The processor-readable storage medium of claim 15 wherein the given video stream provided by the scalable video server comprises a combination of multiple sub-streams served by respective ones of the file system servers of the respective file system storage nodes to the file system client.

17. The processor-readable storage medium of claim 15 wherein the number of file system storage nodes utilized for the given video stream in the scalable video server is controlled based at least in part on feedback from the file system client.

18. The processor-readable storage medium of claim 15 wherein the file system servers of the respective file system storage nodes are distributed across multiple physical machines of the storage system.

19. The processor-readable storage medium of claim 18 wherein one or more of the physical machines each comprise at least one of a software-defined storage client and a software-defined storage server configured to provide one or more of the file system servers with access to storage resources of the one or more physical machines.

20. The processor-readable storage medium of claim 15 wherein a given one of the file system servers is implemented on a first physical machine and is associated with a software-defined storage client also implemented on that first physical machine and further wherein the software-defined storage client is configured to interact with a corresponding software-defined storage server implemented on a second physical machine so as to provide the given file system server with access to storage resources of the second physical machine.

* * * * *